US008220788B2

(12) United States Patent
Lube

(10) Patent No.: US 8,220,788 B2
(45) Date of Patent: Jul. 17, 2012

(54) MACHINE TOOL

(75) Inventor: Siegfried Lube, Weilheim (DE)

(73) Assignee: Gildemeister Drehmaschinen GmbH (DE)

( * ) Notice: Subject to any disclaimer, the term of this patent is extended or adjusted under 35 U.S.C. 154(b) by 750 days.

(21) Appl. No.: 12/372,972

(22) Filed: Feb. 18, 2009

(65) Prior Publication Data

US 2009/0208314 A1 Aug. 20, 2009

(30) Foreign Application Priority Data

Feb. 19, 2008 (DE) .......................... 10 2008 009 989

(51) Int. Cl.
*B23Q 1/25* (2006.01)
(52) U.S. Cl. ............................... 269/55; 269/71; 269/60
(58) Field of Classification Search .................. 269/71, 269/75, 95, 289 R, 55, 60, 900, 903; 414/223.01
See application file for complete search history.

(56) References Cited

U.S. PATENT DOCUMENTS

| | | | | |
|---|---|---|---|---|
| 3,797,081 | A * | 3/1974 | Buzzi ............................. | 29/38 C |
| 5,906,539 | A * | 5/1999 | Tabel ............................. | 451/403 |
| 5,960,531 | A * | 10/1999 | Mora et al. ..................... | 29/560 |
| 6,553,656 | B1 * | 4/2003 | Kumeth .......................... | 29/785 |

FOREIGN PATENT DOCUMENTS

| | | |
|---|---|---|
| DE | 4422416 | 1/1996 |
| DE | 19847284 | 4/1999 |
| DE | 102004029916 | 12/2005 |

* cited by examiner

*Primary Examiner* — Lee D Wilson
(74) *Attorney, Agent, or Firm* — Bourque and Associates, PA

(57) ABSTRACT

A machine tool including a spindle oriented along a first direction with an adjustable chuck to receive a piece to be worked on. The machine tool further includes a transport device positioned essentially perpendicular to the first direction with deposit areas for the deposit of a number of the pieces to be worked on. The transport device is positioned such that each of the deposit areas may be moved into a transfer position in order to receive a piece to be worked on from the pertinent deposit area by the adjustable chuck or to release it from the adjustable chuck and to deposit it in the pertinent deposit area. An orientation device is provided that is configured to orient the piece to be worked on in a deposit area such that it may be received by the adjustable chuck in the transfer position. The orientation device is so positioned and configured that orientation of the piece to be worked on by means of the orientation device occurs in an orientation position prior to the transport position along the transport direction such that the orientation device releases the now oriented piece to be worked before it achieves the transfer position.

12 Claims, 3 Drawing Sheets

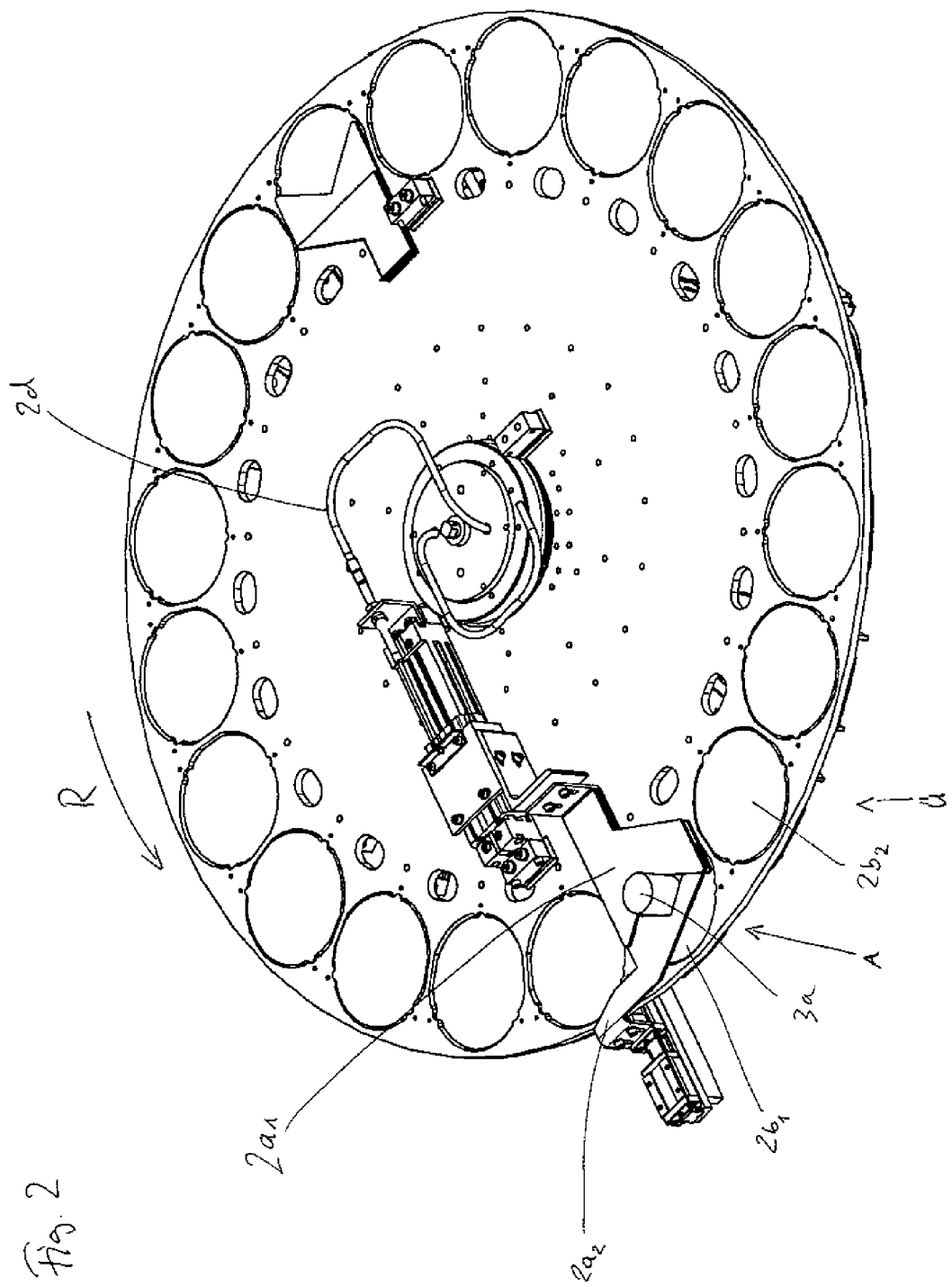

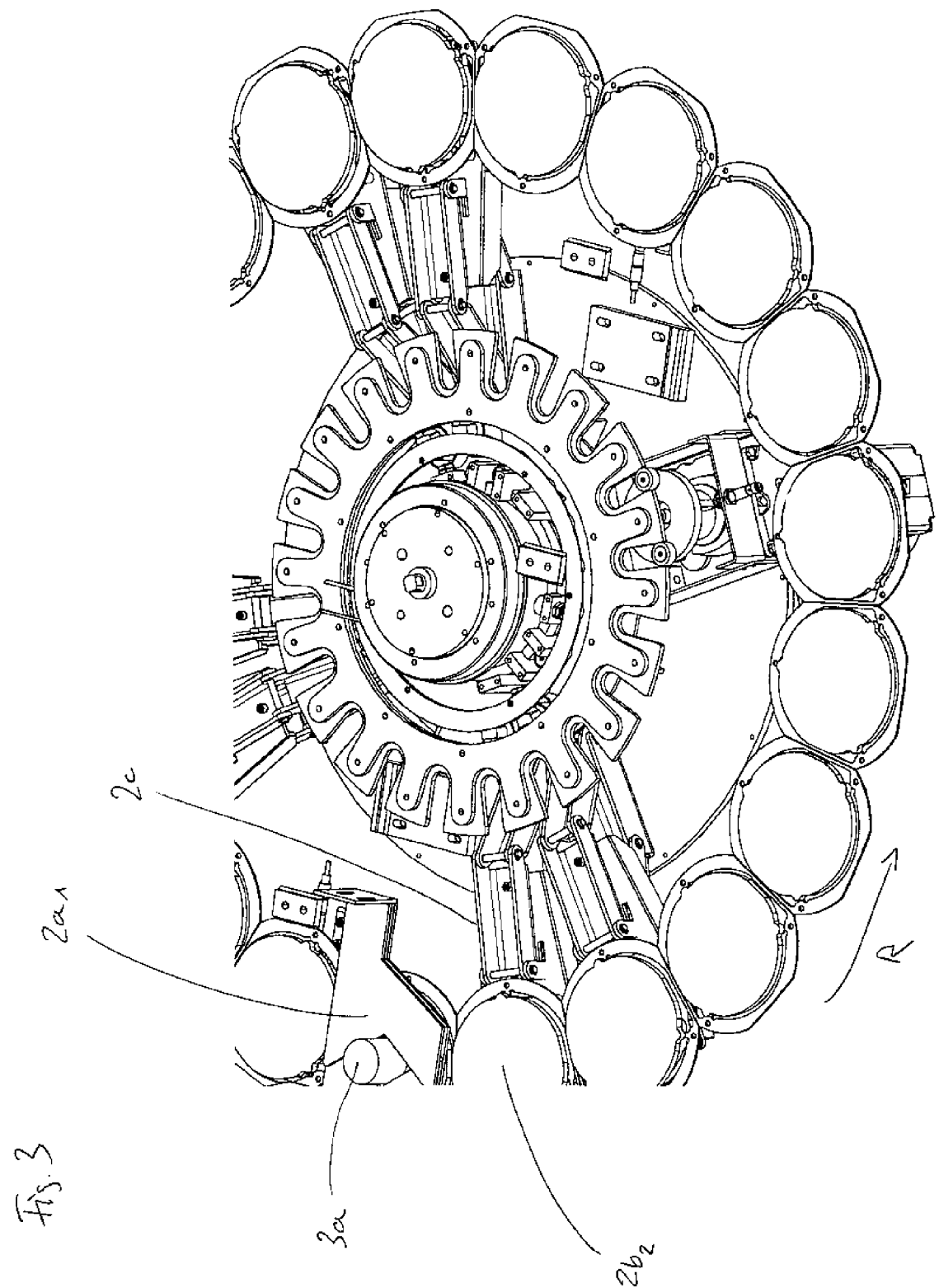

MACHINE TOOL

TECHNICAL FIELD

The present invention relates to a machine tool, and more particularly, to a rotating transport device for receiving and indexing pieces to be worked on and for alternatively presenting new piece to be worked on and receiving a piece after it has been worked on.

BACKGROUND INFORMATION

Certain machine tools such as lathes possess a vertically-mounted spindle on whose underside an adjustable chuck is provided. Such a lathe is known from DE 10 2004 029 916 A1. This known machine tool includes a switchable platform that may be set at various positions, whereby the pieces to be worked on are tensioned at the edges of the switchable platform using the available securing system. This tensioning occurs at the outer edge of the turntable-shaped switchable platform so that during the exchange of pieces being worked should these pieces have varying diameters, a reconfiguration of the adjustable chuck is required. If alternative tensioning using electromagnets occurs, a programming alteration is required in order to recalculate the travel path of the spindle at the transition location. The use of a large number of adjustable chucks and this reprogramming are time-consuming and expensive.

DE 198 47 284 A1 describes a vertical lathe with a transport device that is designed as a continuous transport chain (conveyor). This transport conveyor includes recesses for pieces to be worked on. The pieces are positioned on the recesses but not centered. The pieces to be processed are centered by means of a centering device and secured in this position so that they may be received into the receptor position by the spindle. The centering device possesses a specific design height so that pieces to be worked are secured by it and will no longer be accepted by the adjustable chuck of the spindle if the height of these pieces is approximately the same as the height of the centering device.

SUMMARY

It is thus the intent of the invention to provide a machine tool without major mechanical adaptations similar to the type mentioned at the outset, that does not possess the above-mentioned disadvantages, and is able to process pieces of different sizes which are waiting to be worked on.

Accordingly, it is provided according to the invention that the orientation of pieces to be worked on has already occurred in a position that lies prior to the transfer position along the direction of transport of the transport device. For this, V-shaped orienting elements are advantageously pressed against the piece in an orienting position of the orienting device, thereby orienting the piece for acceptance by the adjustable chuck. Next, the orienting elements are removed from their position against the piece, and the transport device travels or rotates into the transfer position. This results in that the piece to be worked on lies freely within the transport position on the deposit area of the transport device so that the flattest parts may be engaged and accepted by the adjustable chuck. In this position it is advantageously provided that the corresponding deposited item is pre-tensioned against the adjustable chuck.

BRIEF DESCRIPTION OF THE DRAWINGS

These and other features and advantages of the present invention will be better understood by reading the following detailed description, taken together with the drawings wherein:

FIG. 2 is an enlarged, detailed perspective view of the transport device and the orientation device; and FIG. 3 is an enlarged cutaway view of the transport device without turntable.

DETAILED DESCRIPTION OF THE PREFERRED EMBODIMENTS

Figure 1:
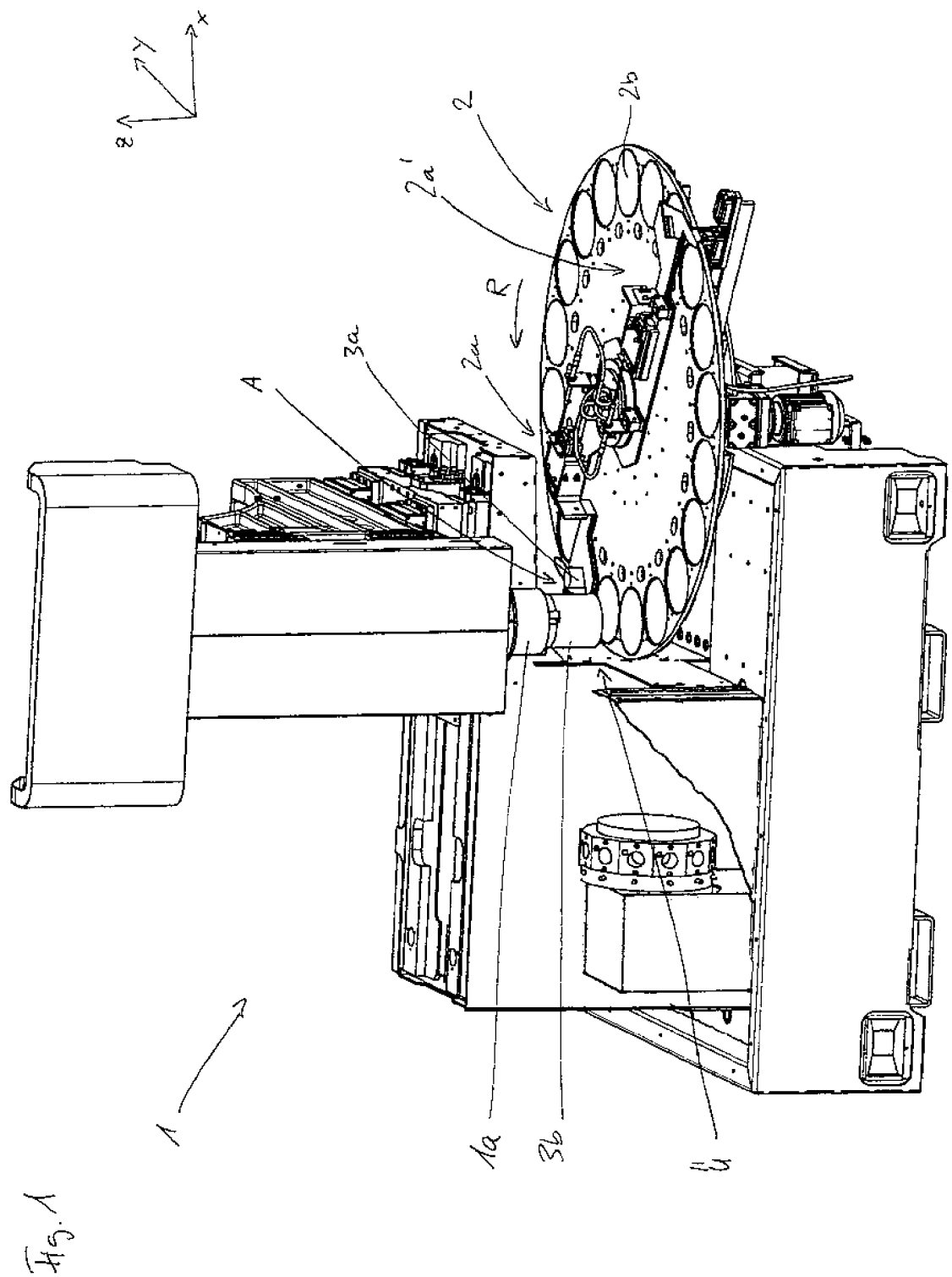
FIG. 1 is a perspective view of a machine tool based on the invention.

The machine tool 1 includes a spindle nose with spindle axis oriented along the vertical direction Z, whereby the spindle nose includes an adjustable chuck and/or chuck at its lower end that serves to accept pieces to be worked $3a$, $3b$. The mode of function of the chuck $1a$ is known, and therefore will not be described here in greater detail. The pieces $3a$, $3b$ which are to be processed are held in a transport device 2 that possesses deposit areas $2b$, $2b_1$, $2b_2$ for the deposit of said pieces $3a$, $3b$. To accept pieces $3a$, $3b$ into the adjustable chuck $1a$, the transport device $2a$ is advantageously configured as a turntable or adjusting disk which in the illustrated example may be displaced along a transport direction R so that pieces $3a$, $3b$ which are deposited into the deposit areas $2b$, $2b_1$, $2b_2$ are displaced within the XY plane, and may be brought into a transfer position U below the adjustable chuck $1a$. The adjustable chuck $1a$ may accept the corresponding work piece $3a$, $3b$ at this transfer position. The deposit areas $2b$, $2b_1$, $2b_2$ are advantageously capable of being raised so that they may be pressed into the transfer position U by means of a tensioning or raising device $2c$ (see FIG. 3) along the direction toward the adjustable chuck $1a$. Thus the pieces to be worked $3a$, $3b$, which are located at the corresponding deposit area, are received into the chuck $1a$ and supported, and slippage is prevented.

Based on the invention, at least one orienting device $2a$ is provided, and advantageously two diametrically-opposing orienting devices $2a$, $2a'$ are used, whereby any further description will be based on the example of the orientation device $2a$.

Based on the invention, the orientation device $2a$ is effective only in an orientation position A (see FIG. 2 particularly) which is located prior to the transfer position U along the transport direction R. In the example shown, the transport device implemented as a turntable rotates counter-clockwise, whereby deposit areas $2b$, $2b_1$, $2b_2$ are further displaced along the transport direction R by one position with each switching.

When a deposit area $2b_1$ reaches the orientation position A, it is in the orienting position. The piece to be worked $3a$, located at the corresponding deposit area $2a$ to be used that is located on the deposit area $2b_1$ is oriented or centered in the orientation position A of the transport device by means of an orientation device $2a$ into a receptor position for the adjustable chuck $1a$. For this orientation, two advantageously opposing, displaceable orientation elements $2a_1$, $2a_2$ are provided in the orientation device $2a$ each possessing a V-shaped cross-section on their sides that face the piece $3a$ to be oriented. The obliquely-extending edges of the V-shaped section serve as a guide for the piece $3a$, and when the orientation elements $2a_1$, $2a_2$ are moved toward the piece $3a$, this piece $3a$ is displaced until a defined receptor position on the deposit area $2b_1$ for this piece to be worked $3a$ is achieved. The two orientation elements $2a_1$, $2a_2$ may advantageously be driven by means of a Bowden cable, but other adjustment mechanisms are equally conceivable. After the piece $3a$ has achieved the orientation position A and been oriented into the receptor position on the deposit area $2b_1$ (see FIGS. 2 and 3), the orientation device $2a$ is deactivated in that the orientation elements $2a_1$, $2a_2$ are moved away from the piece $3a$, which in turn remains in the receptor position.

At the same time, a piece $3b$ that was previously being worked on may be released from the chuck $1a$ and deposited onto the deposit area $2b_2$, which in the illustrated example is located at this moment in the transfer position U located behind the orientation position A along the transport direction R. The positioning of the deposit areas is advantageously selected such that a deposit area $2b_1$ located in the orientation position A lies adjacent to a deposit area $2b_1$ that in turn is located in the transfer position U. Thus, the piece being worked $3a$ may be oriented in the orientation position A at the same time that a previously-processed piece $3b$ is released into the transfer position U from the chuck $1a$ and is deposited onto an adjacent deposit area $2b_2$.

Next, the transport device 2 is further displaced along the transport direction until the deposit area $2b_1$ with its oriented piece $3a$ is located in the transfer position U. Then the piece to be worked $3a$ can be accepted by the adjustable chuck $1a$, under pre-tensioning of the deposit area $2b_1$ along the direction of the adjustable chuck $1a$ as necessary. A Geneva drive or other drive that enables essentially smooth motion of the transport device 2 between the individual switching positions is advantageously used.

It is thus possible based on the invention to transfer the flattest possible components without interfering centering aids to the adjustable chuck $1a$ without the adjustable chuck being displaced to be perpendicular to the axis of the spindle. Also, the size of the piece to be processed is limited merely by the maximum expanded width of the jaws of the chuck so that a piece of any size may be processed without any mechanical or programming-equipment adjustment of the machine tool. For pieces extending essentially along the direction of the spindle (Z-direction), Z-adjustment of the transport device may be provided along with adjustment of the adjustable chuck itself.

Modifications and substitutions by one of ordinary skill in the art are considered to be within the scope of the present invention, which is not to be limited except by the allowed claims and their legal equivalents.

The invention claimed is:

1. A machine tool (1), having a spindle revolving around a spindle axis oriented along a vertical direction (Z), said spindle including an adjustable chuck ($1a$) configured to receive a piece to be worked ($3a$, $3b$), said machine tool further including a rotatable transport device (2) positioned essentially perpendicular to said vertical direction (Z) and having a plurality of work piece deposit areas ($2b$, $2b_1$, $2b_2$) configured for holding, releasing and depositing one or more pieces to be worked by said machine tool ($3a$, $3b$) to said adjustable chuck ($1a$) of said spindle, whereby the transport device (2) is configured such that each of the plurality of deposit areas ($2b$, $2b_1$, $2b_2$) may be rotatably moved into a transfer position (U) for presentation to the adjustable chuck ($1a$) of a first one of said one or more pieces to be worked in order that said adjustable chuck may accept said first piece to be worked ($3a$) from a first deposit area ($2b$) into the adjustable chuck ($1a$), and wherein said adjustable chuck ($1a$) includes a mechanism for releasably attaching the first piece to be worked ($3a$) from the adjustable chuck ($1a$) and to deposit the first piece to be worked ($3a$) onto a second deposit area ($2b_1$), whereby an orientation device ($2a$) is provided that is configured to orient the first piece to be worked ($3a$) in the first deposit area ($2b$) prior to said adjustable chuck ($1a$) accepting each said one or pieces to be worked such that each said one or more pieces to be worked may be received by the adjustable chuck ($1a$) in the transfer position (U), characterized in that the orientation device ($2a$) is so positioned and configured that the orientation of each of said one or more pieces to be worked ($3a$) by means of the orientation device ($2a$) occurs in an orientation position (A) located prior to the transfer position (U) along a transport direction (R) of the transport device (2), such that the orientation device ($2a$) includes a mechanism having linear movement in which orients and releases the each said one or more pieces to be worked ($3a$) before it reaches the transfer position (U).

2. The machine tool (1) as in claim 1, characterized in that the transport device (2) is a turntable.

3. The machine tool (1) as in claim 1, characterized in that the transport device (2) has an arm which is raised and lowered being connected to said orientation device (2).

4. The machine tool (1) as in claim 3, characterized in that a Geneva drive is provided to move the transport device in a smooth manner.

5. The machine tool (1) as in claim 1, characterized in that the deposit areas ($2b$, $2b_1$, $2b_2$) are pre-tensioned in the transfer position (U) along the direction of the adjustable chuck ($1a$).

6. The machine tool (1) as in claim 1, characterized in that the transport device (2) is adjustable along the first direction (Z) relative to the adjustable chuck.

7. The machine tool (1) as in claim 1, characterized in that the orientation device ($2a$) includes at least one movable orientation element ($2a_1$, $2a_2$) perpendicular to the first direction (Z).

8. The machine tool (1) as in claim 7, characterized in that two moveable orientation elements ($2a_1$, $2a_2$) are provided.

9. The machine tool (1) as in claim 8, characterized in that the two moveable orientation elements ($2a_1$, $2a_2$) possesses an approximately V-shaped section configured to rest against the piece being worked ($3a$) wherein said other moveable element moves with respect to said V-shaped section by means of a linear actuator contacting a portion of said other movable element.

10. The machine tool (1) as in claim 1, characterized in that the orientation position (A) is positioned adjacent to the transfer position (U) of the transport device (2).

11. The machine tool (1) as in claim 9, characterized in that a said V-shaped section is connected to a linear actuator.

12. A machine tool (1), having a spindle revolving around a spindle axis oriented along a vertical direction (Z), said spindle including an adjustable chuck ($1a$) configured to receive a piece to be worked ($3a$, $3b$), said machine tool further including a rotatable transport device (2) positioned essentially perpendicular to said vertical direction (Z) and having a plurality of work piece deposit areas ($2b$, $2b_1$, $2b_2$) configured for holding, releasing and depositing one or more pieces to be worked by said machine tool ($3a$, $3b$) to said adjustable chuck ($1a$) of said spindle, whereby the transport device (2) is configured such that each of the plurality of deposit areas ($2b$, $2b_1$, $2b_2$) may be rotatably moved into a transfer position (U) for presentation to the adjustable chuck ($1a$) of a first one of said one or more pieces to be worked in order that said adjustable chuck may accept said first piece to be worked ($3a$) from a first deposit area ($2b$) into the adjustable chuck ($1a$), and wherein said adjustable chuck ($1a$) may release the first piece to be worked ($3a$) from the adjustable chuck ($1a$) and to deposit the first piece to be worked ($3a$) onto a second deposit area (2b₁), whereby an orientation device (2a) is provided that is configured to orient the first piece to be worked (3a) in the first deposit area (2b) prior to said adjustable chuck (1a) accepting each said one or pieces to be worked such that each said one or more pieces to be worked may be received by the adjustable chuck (1a) in the transfer position (U), characterized in that two moveable orientation elements (2a₁, 2a₂) are provided, wherein the two moveable orientation elements (2a₁, 2a₂) possess an approximately V-shaped section configured to rest against the piece being worked (3a), characterized in that the orientation device (2a) is so positioned and configured that the orientation of each of said one or more pieces to be worked (3a) by means of the orientation device (2a) occurs in an orientation position (A) located prior to the transfer position (U) along a transport direction (R) of the transport device (2), such that the orientation device (2a) orients and releases the each said one or more pieces to be worked (3a) before it reaches the transfer position (U).

* * * * *

UNITED STATES PATENT AND TRADEMARK OFFICE
CERTIFICATE OF CORRECTION

PATENT NO. : 8,220,788 B2
APPLICATION NO. : 12/372972
DATED : July 17, 2012
INVENTOR(S) : Siegfried Lube It is certified that error appears in the above-identified patent and that said Letters Patent is hereby corrected as shown below:

Col. 3, Line 48 should read
1. A machine tool (1), having a spindle revolving around a spindle axis oriented along a vertical direction (Z), said spindle including an adjustable chuck (1a) configured to receive a piece to be worked (3a, 3b), said machine tool further including a transport device (2) positioned essentially perpendicular to said vertical direction (Z) and having a plurality of work piece deposit areas (2b, 2b1, 2b2) configured for depositing one or more pieces to be worked by said machine tool (3a, 3b) to said adjustable chuck (1a) of said spindle, whereby the transport device (2) is configured such that each of the plurality of deposit areas (2b, 2b1, 2b2) is moved into a transfer position (U) for presentation to the adjustable chuck (1a) of one of said one or more pieces to be worked, wherein a mechanism of said adjustable chuck is configured to accept said piece to be worked (3a) from a deposit area (2b) into the adjustable chuck (1a), and wherein said mechanism of said adjustable chuck is configured to release the piece to be worked (3a) from the adjustable chuck (1a) and to deposit the piece to be worked (3a) onto a deposit area (2b, 2b1, 2b2), whereby an orientation device (2a) is provided that is configured to orient the piece to be worked (3a) in a deposit area (2b, 2b1, 2b2) prior to said adjustable chuck (1a) accepting each said one or more pieces to be worked (3a), such that each said one or more pieces to be worked may be received by the adjustable chuck (1a) in the transfer position (U), characterized in that the orientation device (2a) is so positioned and configured that the orientation of each of said one or more pieces to be worked (3a) by means of the orientation device (2a) occurs in an orientation position (A) located prior to the transfer position (U) along a transport direction (R) of the transport device (2), such that the orientation device (2a) includes an orientation mechanism, wherein said orientation mechanism orients each said one or more pieces to be worked (3a) in said orientation position (A) before it reaches the transfer position (U).

Col. 4, Line 18 should read
3. The machine tool (1) as in Claim 1, characterized in that the deposit areas (2b, 2b1, 2b2) are configured to be raised into the transfer position (U) by a raising device (2c).

Signed and Sealed this
Ninth Day of October, 2012

David J. Kappos
*Director of the United States Patent and Trademark Office*

Col. 4, Line 37 should read

9. The machine tool (1) as in Claim 8, characterized in that the two moveable orientation elements (2a1, 2a2) possesses an approximately V-shaped section configured to rest against the piece being worked (3a), wherein at least one of said movable orientation elements moves with respect to said V-shaped section by means of a linear actuator.